United States Patent [19]

Balcerski et al.

[11] 4,224,149

[45] Sep. 23, 1980

[54] PROCESS USEFUL IN THE FLOCCULATION OF PHOSPHATE SLIMES

[75] Inventors: James S. Balcerski; Arthur M. Schiller, both of Stamford, Conn.; Arthur Snow, Alexandria, Va.

[73] Assignee: American Cyanamid Company, Stamford, Conn.

[21] Appl. No.: 34,118

[22] Filed: Apr. 30, 1979

[51] Int. Cl.$^2$ .............................................. C02B 1/20
[52] U.S. Cl. .................................. 210/705; 210/728; 210/907
[58] Field of Search ................... 210/42 R, 51–54, 210/DIG. 29

[56] References Cited

U.S. PATENT DOCUMENTS

| 2,783,200 | 2/1957 | Crum et al. | 210/54 |
| 3,418,237 | 12/1968 | Booth et al. | 210/54 |
| 3,932,275 | 1/1976 | Mewes et al. | 210/53 X |
| 4,036,749 | 7/1977 | Anderson | 210/53 X |
| 4,049,547 | 9/1977 | Hamer et al. | 210/54 |

Primary Examiner—Thomas G. Wyse
Attorney, Agent, or Firm—William J. vanLoo; Paul W. Leuzzi

[57] ABSTRACT

Use of an effective amount of a precipitant or sequestrant for calcium ions improves performance of anionic polymeric carboxylic acid flocculants in flocculating phosphate slimes.

6 Claims, No Drawings

PROCESS USEFUL IN THE FLOCCULATION OF PHOSPHATE SLIMES

This invention relates to a process of the flocculation of phosphate slimes in the presence of calcium ions. More particularly, this invention relates to such a process wherein a polymeric anionic flocculant is used in conjunction with a precipitant or sequestering agent for the calcium ions.

Waste waters, or slimes, from phosphate mining and processing operations have conventionally been stored in huge dyked holding ponds covering many acres. The suspended solids in the slimes, generally about 1-5%, settle very slowly and the resulting mud remains fluid for as long as twenty years. While this type of operation ties up large land areas, there is presently no economically feasible alternative.

While the costs of diking charges for the holding ponds are rising, an alternative treatment method must be in a competitive price range to be acceptable. While flocculants appear to offer a potential alternative, dosage requirements have been too high to make such procedures competitive in price. A preferred polymeric type of flocculant for this use is of anionic charge. The presence of calcium ions in the phosphate slimes adversely affects the performance of anionic polymeric flocculants and increases dosage requirements for effective settling.

What is needed, therefore, is a process for flocculating phosphate slimes using anionic polymeric flocculants wherein the adverse effects arising from calcium ions present in such slimes are negated and improved efficiency in flocculation results. The provision for such a process would fulfill a long-felt need and constitute a significant advance in the art.

In accordance with the present invention, there is provided an improvement in the process for flocculating phosphate slimes containing calcium ions which comprises treating said slimes with an anionic polymeric flocculant deriving its anionicity from carboxylic acid groups and settling solids of the thus-treated slimes, the improvement comprising adding to said slimes an effective amount of a precipitant or sequestering agent for said calcium ions.

The present invention enables low dosages of anionic polymeric flocculants to be used to obtain efficient settling rates and provides a competitive alternative to dikes holding ponds. It is highly surprising that the addition of sequestrants or precipitants for the calcium ions would affect such greatly improved efficiency in settling rates using the anionic polymeric flocculants.

In carrying out the process of the present invention, flocculation of the phosphate slimes is carried out following conventional procedures using an anionic polymeric flocculant deriving its anionicity from carboxylic acid groups and settling the flocculated slimes except that a precipitant or sequestering agent for calcium ions is employed along with the flocculant. Particularly effective flocculants useful in the present process are those that contain repeating units of acrylamide and acrylic acid and have molecular weights of several million or more, usually about 7-8 million. These polymeric flocculants may be obtained by copolymerization of acrylic acid and acrylamide or by hydrolysis of polyacrylamide or polyacrylonitrile. The content of carboxylic acid groups in the polymeric flocculant may vary from about 5 to about 70 mole percent or more. Particularly good results are obtained when the content of acrylic acid groups is in the range of about 10-25 mole percent. Use of the anionic polymeric flocculant may be in the range of abut 0.1 to about 10.0 parts per million parts of sludge, preferably about 0.5 to about 5.0 parts per million, same basis.

Suitable sequestrants or precipitants for calcium ions include, for example, ethylenediaminetetraacetic acid, sodium carbonate, water-soluble phosphonates, iminodiacetic acid, nitrilotrioacetic acid, and the like. The sequestrants or precipitants are employed in effective amount which is indicated by an increase in settling rate of the flocculated slimes. The actual amount of sequestrant or precipitant that is effective for use with any given phosphate slime will vary widely depending upon many variables such as the calcium ion content of the slime, the particular sequestrant or precipitant employed, the particular anionic polymeric flocculant employed, and the like. The particular amount can readily be determined by analysis of the phosphate slime for calcium ion content. The amount of sequestrant or precipitant can then be determined taking into account the acid content of the anionic polymeric flocculant. It is not necessary to sequester or precipitate all of the calcium ions with sequestrant or precipitant but it is only necessary to use a sufficient amount of sequestrant or precipitant to provide an increased filtration rate.

The invention is more fully illustrated by the examples which follow wherein all parts and percentages are by weight unless otherwise specified.

COMPARATIVE EXAMPLE

A sample of phosphate slimes obtained from a typical Florida phosphate mining operation was diluted to 1% solids for flocculation tests. To the diluted slimes containing 120–150 ppm calcium, as $CaCO_3$, were added 1.2 parts per million parts of slimes of a copolymer of acrylamide and acrylic acid containing 18 mole percent acrylic groups. This polymer was in the form of the sodium salt as employed. Settling rate of the solids was determined to be 0.130 centimeter per second and represents the volume of clear liquor formed above the flocculated slimes.

EXAMPLE 1

The procedure of the comparative example was repeated except that there was also added 380 parts per million parts of slime slurry of ethylenediaminetetraacetic acid as the sodium salt. Settling rate was determined to be 0.580 cm/sec.

EXAMPLE 2

Again following the procedure of the comparative example, 320 parts per million parts of slime slurry of sodium carbonate was added with the flocculant. Settling rate was 0.472 cm./sec.

We claim:

1. In a process for flocculating phosphate slimes containing calcium ions which comprises treating said slimes with an anionic polymeric flocculant deriving its anionicity from carboxylic acid groups and settling solids of the thus-treated slimes, the improvement which comprises adding to said slimes an effective amount of a precipitant or sequestrant for said calcium ions.

2. The process of claim 1 wherein a sequestrant is employed.

3. The process of claim 2 wherein said sequestrant is ethylenediaminetetraacetic acid.

4. The process of claim 1 wherein a precipitant is employed.

5. The process of claim 4 wherein said precipitant is sodium carbonate.

6. The process of claim 1 wherein said anionic polymeric flocculant is a copolymer of acrylamide and acrylic acid.

* * * * *